United States Patent [19]

Macken

[11] Patent Number: 4,941,731
[45] Date of Patent: Jul. 17, 1990

[54] CORNER CUBE UTILIZING GENERALLY SPHERICAL SURFACES

[76] Inventor: John Macken, 3300 Coffey La., Santa Rosa, Calif. 95401

[21] Appl. No.: 68,939

[22] Filed: Jul. 1, 1987

[51] Int. Cl.⁵ .............................................. G02B 5/122
[52] U.S. Cl. .................................................. 350/102
[58] Field of Search ............... 350/102, 106, 109, 320, 350/500, 503, 619, 624, 446

[56] References Cited

U.S. PATENT DOCUMENTS

| | | | |
|---|---|---|---|
| 2,432,984 | 12/1947 | Budenbom | 350/102 |
| 3,663,084 | 5/1972 | Lipkins | 350/102 |
| 3,820,872 | 6/1974 | Lenfart | 350/102 |
| 3,833,893 | 9/1974 | Rajchman | 350/102 |
| 3,851,947 | 12/1974 | Montgomery | 350/109 |
| 3,883,224 | 5/1975 | Tanaka | 350/102 |
| 3,977,765 | 8/1976 | Lipkins | 350/102 |

Primary Examiner—Bruce Y. Arnold
Assistant Examiner—Loha Ben
Attorney, Agent, or Firm—Larry D. Johnson

[57] ABSTRACT

A corner cube utilizing three generally spherical mirrors cancels off axis spherical aberrations to produce focused retroreflected beams. Laser resonator mirror systems utilizing the focusing corner cube exhibit unique properties.

10 Claims, 2 Drawing Sheets

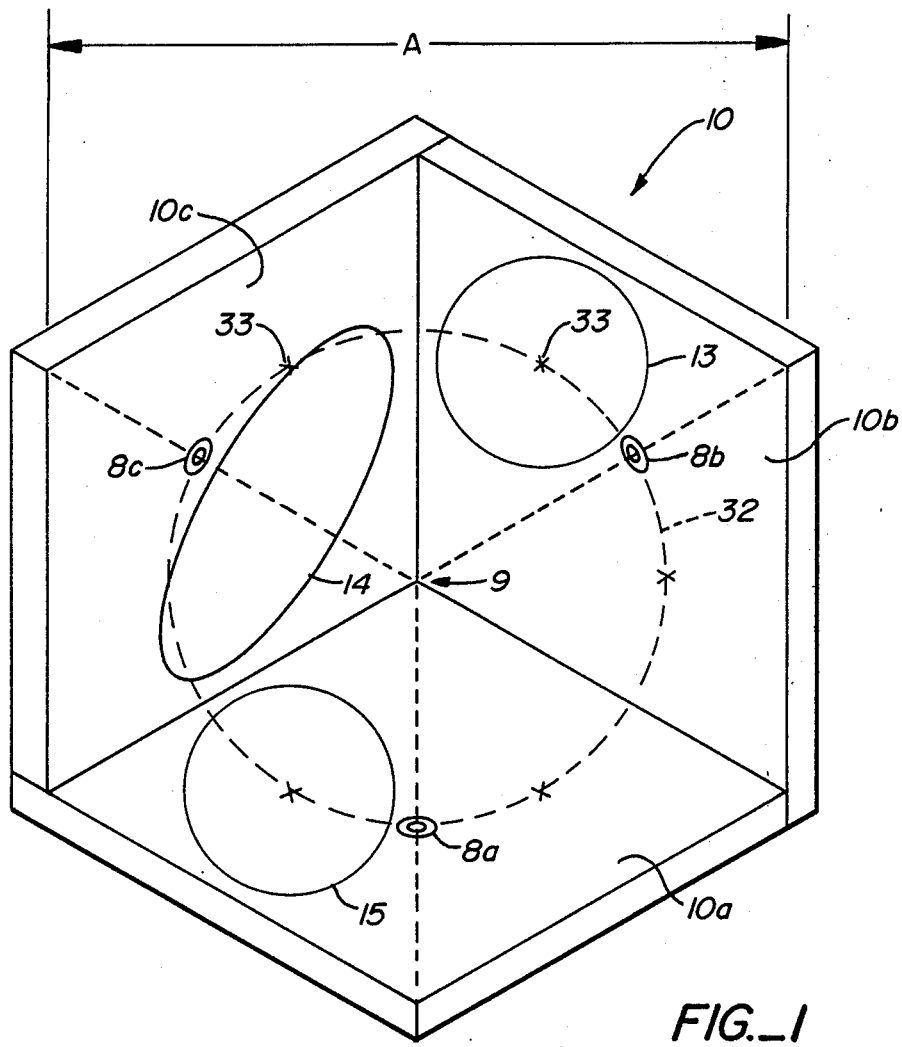
FIG._1

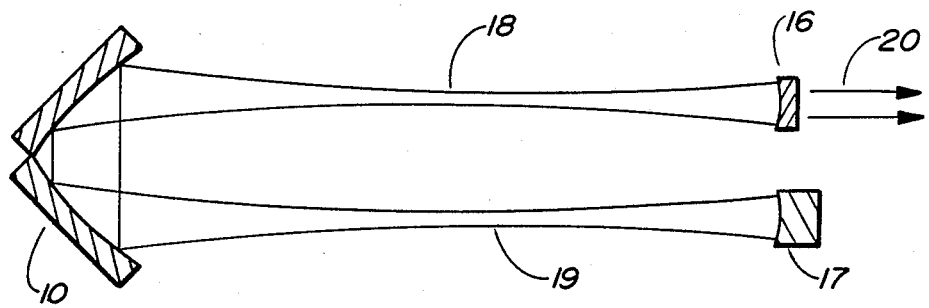
FIG._2
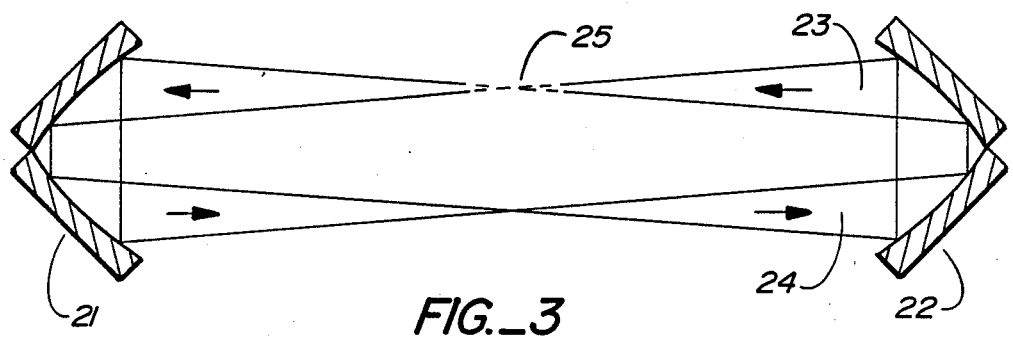
FIG._3
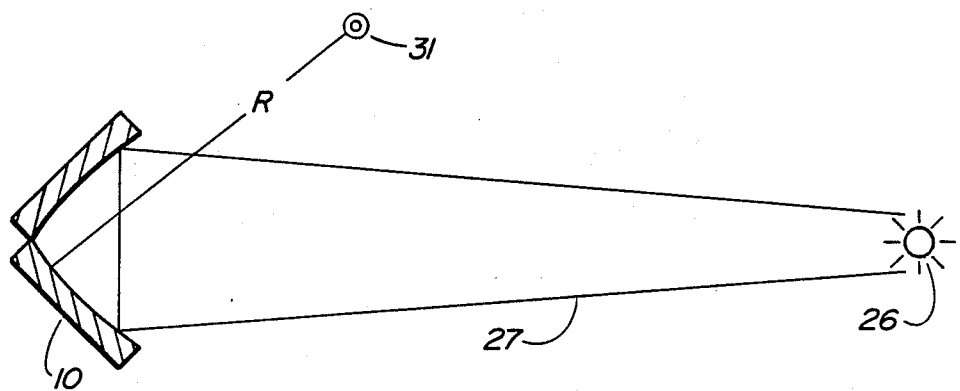
FIG._4

CORNER CUBE UTILIZING GENERALLY SPHERICAL SURFACES

BACKGROUND OF THE INVENTION

Optical corner cubes have long been used because they exhibit an alignment insensitive retroreflection of an optical beam. In the past, these corner cubes have been constructed using three flat mirrors which are positioned mutually orthogonal to each other. This mirror alignment exhibits an apex which is the point where the three mirrors come together. A beam of light which strikes the corner cube displaced from the apex will undergo three reflections and then return parallel to the incident direction except that the return beam is displaced symmetrically on the other side of the apex of the corner cube from the instant beam. Corner cubes have been used in laser systems to provide an alignment insensitive optical element. However, these corner cubes suffer from a drawback since, in many laser systems, it is desirable that the reflected beam receives a predetermined amount of optical power (usually convergence) from the reflecting optics to offset the effect of diffraction. Therefore, while the corner cube exhibits the desirable property of being a retroreflector with great alignment insensitivity, it has the undesirable property of being analogous to an optical flat inasmuch as a divergent optical beam striking the corner cube will continue to diverge as it leaves the corner cube.

In laser systems, for example, spherical mirrors are often used to impart the desired convergence. However, it is well known that spherical mirrors produce low distortion convergence only when used close to the optical axis of the sphere. When spherical mirrors are used even slightly off axis, astigmatisms are introduced which result in distortion of the optical beam. These astigmatisms increase in magnitude as a spherical reflector is used further off axis. This problem of spherical mirrors has largely limited their use to near normal incidence optical systems.

Therefore, it would be desirable to have an optical device which had the retroreflecting properties of a corner cube and yet, the focusing properties of a spherical mirror used on axis.

SUMMARY

A corner cube can be made using three long radius spherical mirrors. The spherical astigmatism exhibited by any single spherical mirror used off axis is corrected by the combination of the three off axis reflections of a corner cube. To obtain good focusing or diverging performance (positive or negative optical power), the three mirrors of the corner cube should have the same radius of curvature, be aligned so that all three mirrors have one point which is tangent to an imaginary perfect flat surface corner cube and the aperture of the corner cube should be smaller than one third the radius of curvature of the three mirrors.

When used in laser resonators, the corner cube exhibiting optical power can be positioned so that the laser beam uses only the clear aperture region of the corner cube, that is, the laser beam does not strike any mirror edges. Alignment insensitive, stable and unstable optical resonator systems can be made using this device.

BRIEF DESCRIPTION OF THE DRAWINGS

FIG. 1 is a perspective view of a focusing corner cube.

FIG. 2 is a diagrammatic view of a focusing corner cube according to the present invention used in conjunction with front and back laser reflectors in a laser system.

FIG. 3 is a diagrammatic view of two focusing corner cubes used in a ring laser.

FIG. 4 is a diagrammatic view of a focusing corner cube reimaging a point of light.

DETAILED DESCRIPTION

It has been found both experimentally and mathematically that it is possible to make focusing corner cubes which can exhibit diffraction limited performance. Such a corner cube is made using three long radius spherical mirrors instead of using three optically flat mirrors. To obtain good focusing performance, these three spherical mirrors should have the following properties. (1) The three mirrors all should have approximately the same radius of curvature (usually concave). (2) The three spherical mirrors should be aligned so that they all have one point each which is tangent to an imaginary corner cube made using perfect flats aligned orthogonally. (3) The said radius of curvature should be larger than three times the aperture size of the corner cube. Surprisingly, even though each of the spherical mirrors is used far off axis introducing distortion, this distortion cancels out when light undergoes the three reflections in the retroreflector. This results in perfect focusing of the retroreflected beam.

Referring now to FIG. 1, item 10 is a corner cube constructed from three long radius of curvature concave spherical mirrors. These mirrors appear flat in this figure because the radius of curvature is very long. These mirrors are designated 10A, 10B and 10C. A beam of light designated 13 strikes mirror 10B and is reflected to mirror 10C producing elliptical reflection 14, then is reflected to mirror 10A producing reflection 15. Reflection 15 then returns parallel to incident beam 13 except that it is symmetrically displaced on the other side of the apex 9. Beam 13, in this example, was chosen to have a diameter so that the beam entirely fits within the projected triangle (when viewed from the perspective of FIG. 1) formed by the edges of the mirrors and the reflection of the edges of the mirrors depicted in FIG. 1. When looking at this corner cube, there are six such triangles so other beams could use other portions of the same corner cube without intersecting edges. When three long radius spherical mirrors are used for mirrors 10A, 10B and 10C in FIG. 1, it has been found that illuminating the entire corner cube with an expanded parallel laser beam produces six focus spots. To the limit of the optical equipment available, each of these spots has been observed to be near diffraction limited for a helium neon laser wavelength. An exact measurement of the helium neon spot size was not made because the corner cube was intended for use at 10.6 microns. This experiment also indicated that the focal length for the six spots was approximately 14.5% of the radius length of the mirrors used to make the corner cube. For example, with three mirrors 50 m radius concave, six diffraction limited focal spots were formed 7.25 meters from the corner cube.

A mathematical analysis of this effect was run on a small computer. This analysis has indicated that the optical distortion was less than 1/50 wavelength of 10 micron light using a corner cube of a size and focal distance suitable for use with $CO_2$ laser. Furthermore, tilting of the corner cube on the order of several milliradians still produced diffraction limited and aligned beams.

In discussing corner cubes made with spherical reflectors, it is important to define a point of reference for discussion of the alignment of the three reflectors. The alignment of mirrors 10A, 10B and 10C can be referenced to a corner cube made with flat mirrors by defining the point on each spherical mirror which is tangent to a corner cube made of flat mirrors. In FIG. 1, this point of tangency on each mirror is designated by circles 8A, 8B and 8 C. There are three alignment configurations which warrant special attention. First of all, it would be possible to have all three mirrors be tangent to the flat mirror corner cube at the apex of the corner cube. This alignment would have the property of taking parallel light incident on the corner cube and bringing it to a single focus on the axis defined by the ray of the parallel light which intersects the apex of the corner cube. This alignment configuration is somewhat analogous to placing a long focal length converging lens in front of the conventional plain mirror corner cube. This alignment configuration will be known as the "single focus alignment." A second alignment configuration would be to have the points of tangency be near the center of each of the three square mirrors (10A, 10B, 10C). This is the alignment depicted in FIG. 1 by tangency points 8A, 8B and 8C. This alignment configuration has the property that parallel light incident on this corner cube would be brought to six focal points which were symmetrically distributed around the axis defined by the ray of the parallel light which intersects the apex of the corner cube. These six spots also lie on the circle 32 whose circumference also intersects the three points of tangency (8A, 8B, 8C). Some of the focal points are designated as 33 in FIG. 1. This corner cube alignment configuration is most suitable to use in conjunction with six symmetrically positioned laser tubes. In the preferred embodiment, each tube would be positioned to use one of the six triangular clear apertures of the corner cube. Two of the six laser beams would correspond to 13 and 15 in FIG. 1. This will be referred to as the "symmetrical alignment configuration." The third alignment configuration of interest is to have the points of tangency chosen to create the absolute minimum distortion for a single beam reflecting from the corner cube. For example, a ring laser using a focusing corner cube can be aligned to minimize optical distortion for that single beam path. To accomplish this, the points of tangency would be the centers of circles 13 and 15 and the center of ellipse 14. This alignment configuration is known as the "minimum distortion alignment." It also produces six focus spots in retroreflection when the corner cube is fully illuminated with parallel light. However, these six focus spots do not lie on a single circle around the optical axis which is the axis defined by the ray of parallel light which intersects the apex of the corner cube.

Another requirement for the focusing corner cube is that the three mirrors all have a generally equal radius of curvature R and that R is long compared to the aperture dimension of the corner cube. The long radius (R) cannot be shown to scale, but is illustrated in FIG. 4 where 31 is the center of curvature of one of the mirrors shown in cross-section. The aperture of a corner cube is the projected usable optical size of the corner cube. In FIG. 1, the aperture would be the distance between any two parallel outside edges of the corner cube (approximately 13 cm). The radius of curvature R would at least exceed the aperture size by as much as more than three times and in the preferred embodiment, the radius would exceed the aperture size by more than a factor of 10.

An analysis of the optical distortion present in this focusing corner cube has been done both experimentally and theoretically. The experimental analysis was conducted during the testing of the corner cubes constructed for use in $CO_2$ laser systems. In this case, molybdenum mirrors with 70 meter radius of curvatures were used. These mirrors were physically 3" square when the tests were conducted. A helium neon laser was expanded and collimated to an 8" diameter. A multiple aperture field stop was inserted in front of the corner cube to eliminate reflections from the edges and corners of the mirrors which were known to have distortion due to polishing tolerances. When the mirrors were aligned in the symmetrical alignment configuration, the helium neon laser beam formed six focus spots about 10 meters from the corner cube. This was equivalent to the focal length of a 20 meter radius of curvature spherical reflector used on axis. Adjustment of the alignment of any one of the corner cube mirrors moved all six focus spots. However, with practice, it was possible to achieve the previously mentioned single focus, symmetrical focus or minimum distortion focus. FIG. 2 shows a diagrammatic drawing of a focusing corner cube used in a laser resonant cavity. In FIG. 2, item 10 is a cross section of a focusing corner cube. Mirrors 16 and 17 are resonator mirrors in a laser system. Mirror 16 is a semi-transparent output coupler mirror, while mirror 17 is a total reflector. The laser beam which resonates between these mirrors has a minimum waste at points 18 and 19 in FIG. 2. This minimum waste is depicted half way between corner cube 10 and reflectors 16 and 17 because, in this example, the equivalent focal length of the corner cube is set equal to the focal length of mirrors 16 and 17. In this example, beam 20 is an output laser beam. If a complete laser was depicted in FIG. 2, an optical gain medium would be shown between mirrors 10 and 16 as well as possibly between 10 and 17. A power source to excite the gain medium would also be included. FIG. 3 is another use of focusing corner cubes which may have application to free electron lasers. Free electron lasers have gain mediums which have the ability to produce high power densities in small cross-sectional areas. In some cases, mirrors have to be removed from this gain region by a substantial distance in order to be able to withstand the power densities generated. The use of two alignment insensitive focusing corner cubes, such as shown in FIG. 3, represents the possible practical solution to this problem. In FIG. 3, corner cubes 21 and 22 are presumed to be made up of long radius concave spherical mirrors all of the same radius of curvature. Furthermore, these two corner cubes are separated by a distance approximately equal to about 58% of the previously said radius of curvature distance. This produces a ring laser as shown in FIG. 3 in which the beams come to a long focal length region half way between the two corner cubes. Dash line 25 in FIG. 3 represents a free electron gain medium which interacts with laser beam 23 producing optical amplification for this beam. In FIG. 3, no method is depicted for extracting the laser power from this ring laser; however, those skilled in the art are familiar with, possible output coupling methods, such as the use of scraper mirrors or semi-transparent reflectors.

FIG. 4 depicts a focusing corner cube aligned in the single focus condition. In this case, retroreflector 10 is illuminated by light 27 from source 26. If light source 26 is positioned at twice the focal length distance of this focusing retroreflector, then light emanating from this source would be returned to the source and forced to the limit of the corner cube. This can be used to advantage in a retroreflector where it is desired to maximize the return signal on a source. For example, in surveying or ranging, the focusing corner cube will give a better return signal than a flat mirror corner cube if the distance separating the light source and the corner cube is known and set equal to twice the focal length of the corner cube.

A mathematical analysis of the astigmatisms of this focusing corner cube indicates that the absolute minimum theoretical distortion is the alignment previously described as the minimum distortion alignment. However, for most practical cases, the symmetrical alignment, or the single focus alignment still give excellent results.

While the discussions previously have centered on using concave mirrors to achieve a focusing retroreflector, it should be understood that a diverging corner cube can be made utilizing three approximately equal radius convex mirrors. Such a corner cube could be used as perhaps an optical element in an unstable resonator laser system. For example, FIG. 3 could consist of converging corner cube 22 and corner cube 21 could be diverging. In this case, the optical path would not come to a focus as depicted in FIG. 3, but could be made to produce a predetermined output beam using the techniques known to those skilled in the art for use with unstable resonator optical systems. Other variations on this will be known to those skilled in the art.

I claim:

1. A method of making a corner cube exhibiting optical power comprising:
   Providing three mirrors, generally spherical in shape, each mirror having a generally spherical surface having a radius of curvature generally equal to R; positioning said spherical surfaces such that each of said three spherical surfaces has a point of tangency to an imaginary perfect corner cube; and sizing each of said three mirrors to form a corner cube having an aperture size A, where R is greater than 3A.

2. The method according to claim 1, wherein said corner cube exhibiting optical power is positioned and aligned to form optical resonance with at least two generally parallel mirrors, furthermore, said corner cube and said parallel mirrors are positioned and configured to function as laser resonator mirrors.

3. The method according to claim 1, wherein said corner cube exhibiting optical power is positioned to face a second corner cube to form at least part of an optical resonant cavity of a laser.

4. The method of claim 1, wherein each of said three generally spherical mirror surfaces is positioned to have a point of tangency to said imaginary perfect corner cube generally near the point of said imaginary corner cube known as the apex where the three surfaces come together.

5. In a corner cube apparatus having three reflecting surfaces, the improvement wherein:
   each of said reflecting surfaces is generally spherical in shape with a radius of curvature generally equal to R;
   said three reflecting surfaces being oriented so that each generally spherical surface has a point of tangency to three perfect imaginary flat surfaces which are mutually orthogonal;
   a corner cube has an aperture size A such that said radius R is greater than 3A such that said corner cube exhibits optical power.

6. The improvement according to claim 5, wherein said corner cube faces at least two generally parallel mirrors such that said corner cube exhibits optical power and said at least two mirrors form an optically resonant laser mirror system.

7. The improvement according to claim 5, wherein two corner cubes exhibiting optical power face each other to form an optically resonant laser mirror system.

8. The improvement according to claim 5, wherein said spherical reflecting surfaces are concave and wherein said points of tangency are such that light reflected from said corner cube exhibits a single focal point when illuminated by parallel light.

9. The improvement according to claim 5, wherein said reflecting surfaces are concave and said points of tangency are positioned such that light reflected from said corner cube exhibits six focal points when illuminated by parallel light; furthermore, said points of tangency are positioned such that at least two of said six focal points are positioned at a predetermined separation distance.

10. The improvement according to claim 5, wherein said spherical reflecting surfaces are convex and wherein said corner cube exhibiting optical power is part of a laser mirror system known as an unstable resonator.

* * * * *